(12) United States Patent
Liu et al.

(10) Patent No.: US 6,904,094 B1
(45) Date of Patent: Jun. 7, 2005

(54) PROCESSING MODE SELECTION FOR CHANNELS IN A VIDEO MULTI-PROCESSOR SYSTEM

(75) Inventors: Vincent Liu, San Diego, CA (US); Robert S. Nemiroff, Carlsbad, CA (US); Siu-Wai Wu, San Diego, CA (US); Ajay Luthra, San Diego, CA (US); Limin Wang, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 868 days.

(21) Appl. No.: 09/665,372

(22) Filed: Sep. 20, 2000

(51) Int. Cl.[7] .......................... H04N 7/12; H04N 11/02
(52) U.S. Cl. .............................. 375/240.13; 375/240.26
(58) Field of Search ................... 375/240.01, 240.03, 375/240.13–240.16, 240.23, 240.25, 240.26, 240.28; 348/388.1, 397.1

(56) References Cited

U.S. PATENT DOCUMENTS

| | | | |
|---|---|---|---|
| 5,513,181 A | | 4/1996 | Bresalier et al. |
| 5,563,884 A | * | 10/1996 | Fimoff et al. ............... 370/391 |
| 5,623,312 A | | 4/1997 | Yan et al. |
| 5,650,860 A | | 7/1997 | Uz |
| 5,686,964 A | * | 11/1997 | Tabatabai et al. ...... 375/240.24 |
| 5,694,170 A | | 12/1997 | Tiwari et al. |
| 5,701,160 A | | 12/1997 | Kimura et al. |
| 5,719,986 A | | 2/1998 | Kato et al. |
| 5,764,296 A | * | 6/1998 | Shin ....................... 375/240.18 |
| 5,838,686 A | * | 11/1998 | Ozkan ......................... 370/433 |
| 5,949,490 A | | 9/1999 | Borgwardt et al. |

(Continued)

FOREIGN PATENT DOCUMENTS

| | | |
|---|---|---|
| EP | 0 851 656 | 7/1998 |
| WO | WO 00 13419 A | 3/2000 |
| WO | WO 00/21302 | 4/2000 |
| WO | WO 00 46997 A | 8/2000 |

OTHER PUBLICATIONS

G. Keesman, et al., "Bit-rate control for MPEG encoders," Signal Processing: IMAGE Communication, vol. 6, pp. 545–560, 1995.

D. Bagni, et al., "Efficient Intra–frame Encoding and improved Rate Control in H.263 compatible format," NTG FACHBERICHTE, pp. 767–774 XP002095679 ISSN: 0341–0196, Sep. 10, 1997.

Björk, Niklas et al., "Transcoder Architectures for Video Coding," IEEE Transactions on Consumer Electronics, vol. 44, No. 1, Feb. 1998, pp. 88–98.

Sun, H., et al., "Architectures for MPEG Compressed Bitstream Scaling," IEEE Transactions on Circuits and Systems for Video Technology, vol. 6, No. 2, Apr. 1, 1996, pp. 191–199.

*Primary Examiner*—Chris Kelley
*Assistant Examiner*—Dave Czekaj
(74) *Attorney, Agent, or Firm*—Lipsitz & McAllister, LLC

(57) ABSTRACT

An efficient processing system, such as for transcoding video data. In an embodiment that is suitable for single or multiple processor embodiments, a processing mode is set for each input video frame, e.g., as a full transcode mode, which uses motion compensation, a requantization mode, which avoids motion compensation, or a bypass mode. The processing mode selection is based on a number of processing cycles that are available to process a frame, and an expected processing requirement of the frame. The bypass or requantization modes are selected to avoid a buffer overflow of the processor.

22 Claims, 7 Drawing Sheets

U.S. PATENT DOCUMENTS

| | | | |
|---|---|---|---|
| 5,986,709 A | 11/1999 | Lee | |
| 5,986,712 A * | 11/1999 | Peterson et al. | 375/240.14 |
| 6,037,985 A * | 3/2000 | Wong | 375/240.03 |
| 6,108,380 A * | 8/2000 | Miyaji et al. | 375/240.03 |
| 6,167,084 A * | 12/2000 | Wang et al. | 375/240.02 |
| 6,192,081 B1 * | 2/2001 | Chiang et al. | 375/240.16 |
| 6,408,096 B2 * | 6/2002 | Tan | 382/232 |
| 6,490,320 B1 * | 12/2002 | Vetro et al. | 375/240.08 |
| 6,639,942 B1 * | 10/2003 | Bayazit | 375/240.01 |
| 6,671,320 B1 * | 12/2003 | Beacken et al. | 375/240.16 |
| 6,690,833 B1 * | 2/2004 | Chiang et al. | 382/236 |
| 2003/0007563 A1 * | 1/2003 | Ryu | 375/240.13 |

* cited by examiner

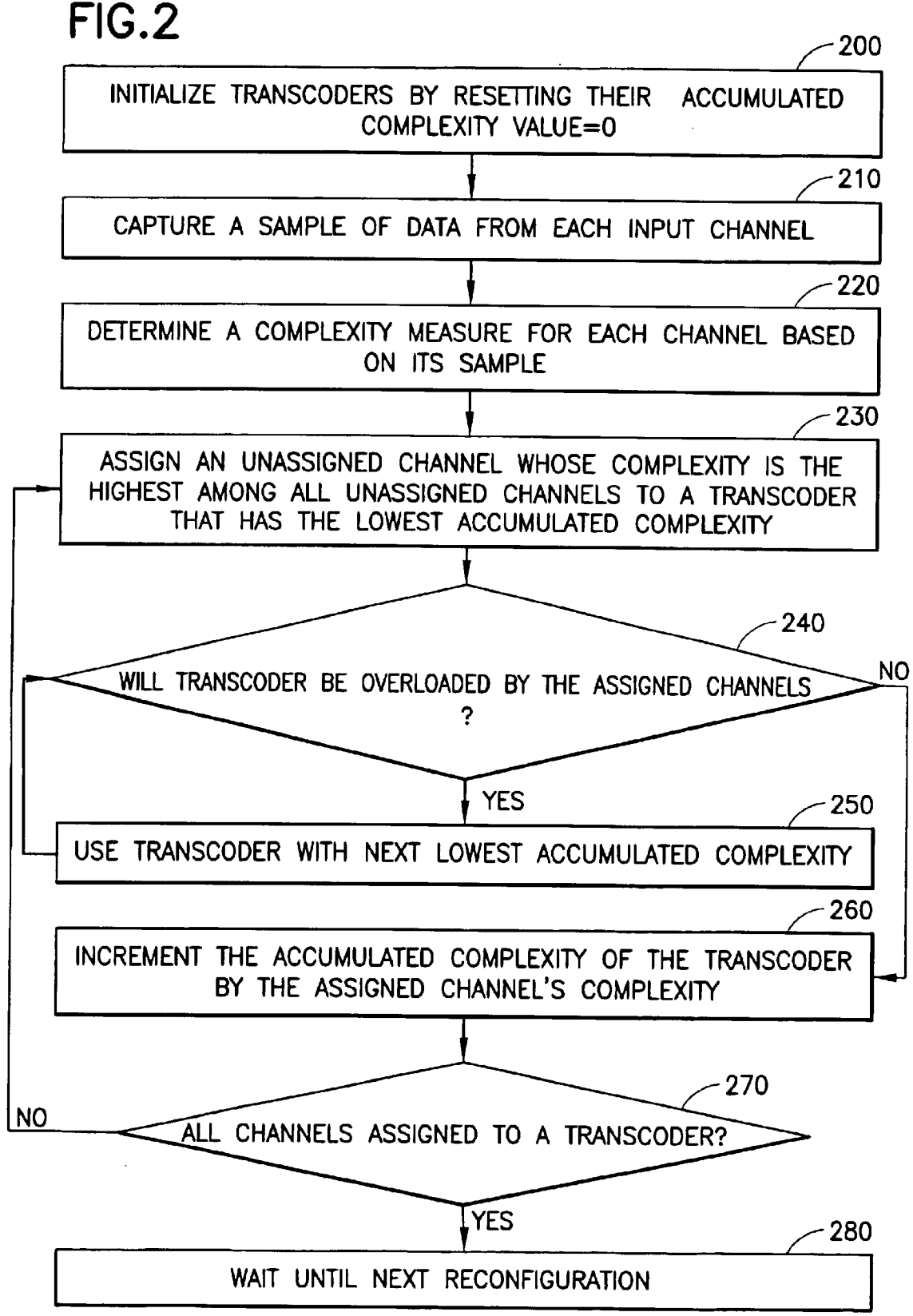

US 6,904,094 B1

PROCESSING MODE SELECTION FOR CHANNELS IN A VIDEO MULTI-PROCESSOR SYSTEM

BACKGROUND OF THE INVENTION

The present invention relates to a system having one or more processors, such as for the transcoding of digital video signals.

Commonly, it is necessary to adjust a bit rate of digital video programs that are provided, e.g., to subscriber terminals in a cable television network or the like. For example, a first group of signals may be received at a headend via a satellite transmission. The headend operator may desire to forward selected programs to the subscribers while adding programs (e.g., commercials or other content) from a local source, such as storage media or a local live feed. Additionally, it is often necessary to provide the programs within an overall available channel bandwidth.

Accordingly, the statistical remultiplexer (stat remux), or transcoder, which handles pre-compressed video bit streams by re-compressing them at a specified bit rate, has been developed. Similarly, the stat mux handles uncompressed video data by compressing it at a desired bit rate.

In such systems, a number of channels of data are processed by a number of processors arranged in parallel. Each processor typically can accommodate multiple channels of data. Although, in some cases, such as for HDTV, which require many computations, portions of data from a single channel are allocated among multiple processors.

However, there is a need for a single or multi-processor system that selects a processing mode for each video frame to minimize transcoding artifacts, which can appear as visible noise in the transcoded image data. The system should also ensure that the total processing cycles that are required to process frames in buffers of the individual processor or processors do not exceed the available processing power of the transcoders.

The present invention provides a processor system having the above and other advantages.

SUMMARY OF THE INVENTION

The present invention relates to a system having one or more processors, such as for the transcoding of digital video signals.

Within each channel, a processing mode is dynamically selected for each picture to maximize the video quality subject to the processing cycle budget constraint/throughput.

For example, for transcoding, if there is an unlimited throughput, "full transcoding" can be performed on every frame. However, because the throughput is constrained, some of the frames may be processed in a "requantization" mode or even a "pass through" (bypass) mode, which can result in additional artifacts. In accordance with the invention, an algorithm is used to select a processing mode for each frame such that the video quality is optimized subject to the limited throughput of the processor.

Generally, a range of processing modes that have different computational intensities are provided so that a less intensive mode can be selected when required to avoid a backup of unprocessed frames.

A particular method in accordance with the invention is suitable for a single processor or a multi-processor system. Specifically, a method for processing compressed video data comprising video frames includes the steps of: maintaining a budget of a number of processing cycles that are available at a processor to process the data, maintaining an estimate of the number of processing cycles required by the processor to process the data, and providing the compressed video data to the processor.

The processor operates in a plurality of modes, such as a full transcoding mode, an abbreviated, requantization mode, and a bypass mode. A mode is selected for processing each video frame according to a relationship between the number of budgeted processing cycles and the estimated number of required processing cycles. That is, a less computationally intensive mode is selected when the required processing cycles begin to exceed the budgeted, or available, processing cycles.

A corresponding apparatus is also presented.

BRIEF DESCRIPTION OF THE DRAWINGS

FIG. 2 illustrates a method for assigning channels of compressed data to a transcoder in a multi-transcoder system in accordance with the invention.

DETAILED DESCRIPTION OF THE INVENTION

The present invention relates to a system having one or more processors, such as for the transcoding of digital video signals.

Figure 1:
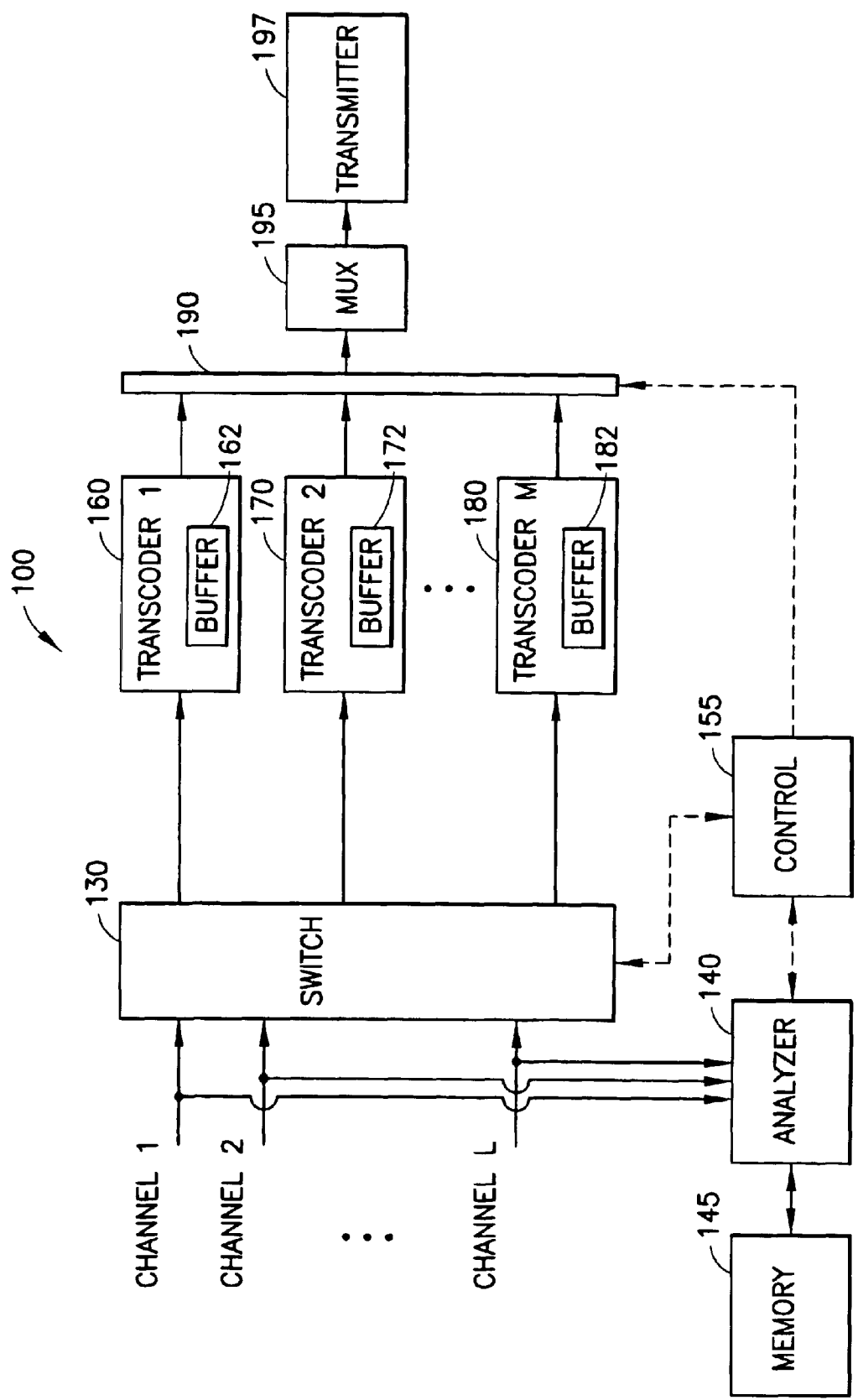
FIG. 1 illustrates a multi-processor system in accordance with the invention.

FIG. 1 illustrates a multi-processor system, shown generally at 100, in accordance with the invention.

L channels of compressed data are provided to a switch 130 that is analogous to a demultiplexer. The channels may be provided via a transport multiplex, e.g., at a cable television headend. Some of the channels may be received via a remote distribution point, such as via a satellite, while other channels may be locally provided, such as locally-inserted commercials or other local programming. Conventional demodulation, grooming, buffering steps and the like are not shown, but should be apparent to those skilled in the art.

The switch 130, under the control of a controller 155, routes the channels to one of M transcoders, e.g., transcoder 1 (160), transcoder 2 (170), . . . , transcoder M.

The transcoded data is output via a bus 190, multiplexed at a mux 195, and transmitted via a transmitter 197, e.g., to a terminal population in a cable television network.

A sample (e.g., segment) of each channel is also provided to an analyzer 140, which uses an associated memory 145 to store the samples and analyze them. The results of this analysis are used by the controller 155 in assigning the channels to the different transcoders 160, 170, ..., 180. The individual transcoders 160, 170, ..., 180 are also referred to herein as "Transcoder core Processing Elements" or TPEs.

The TPEs are allocated to process the incoming video frames in the different channels when a reconfiguration is required, e.g., when the input channels change (e.g., due to adding, removing or replacing). Note that L can be less than, equal to, or greater than M. That is, a TPE may process more than one channel, e.g., for standard definition television (SDTV), or a single channel may be processed by more than one TPE, e.g., for high-definition television (HDTV), which is much more computationally intensive.

At the TPEs, the channels are parsed to decode the picture types therein, e.g., I, P or B pictures, as known from the MPEG standard, for use in selecting an appropriate transcoding mode for each frame to minimize the transcoding artifacts.

The invention minimizes the transcoding artifacts subject to the constraint that the average throughput required to transcode each frame at the TPE does not exceed the available processing power of the TPE.

Note that while multiple processors are shown in FIG. 1, the embodiment of the invention for the selection of cycle-saving modes on the transcoder core processing elements is also suitable for use with a single transcoder which receives one or multiple input channels.

I. Allocation of Channels Among the Transcoder Core Processing Elements (TPEs).

FIG. 2 illustrates a method for assigning channels of compressed data to TPEs in a multi-transcoder system in accordance with the invention.

The goal of the allocation technique is to share workload equally among the TPEs to maximally utilize these resources.

At box 200, the transcoders are initialized so that an associated accumulated complexity value and an accumulated resolution value are reset to zero.

At box 210, the bitstream analyzer 140 captures in its associated memory 145 a sample of input bitstream from each video channel (box 210). The bitstream analyzer 140 estimates the processing cycle requirement (e.g., complexity (Comp[i]) discussed below) for each channel based on the picture types (I, B or P) and a resolution of the frames in the captured samples, which is defined as the average number of macroblocks per second in the input bitstream (i.e., an average macroblock rate).

A complexity measure is determined for each i-th channel as a function of the number of B frames and the resolution (box 220). Specifically, the following complexity measure format may be used.

$$\text{Comp}[i] = F(M[i]) * \text{Res}[i] * U[i] * G_{CBR} (\text{Input bit rate}[i] - \text{Output bit rate}[i]),$$

where M[i] (M=1,2,3, or higher) is one plus the ratio between the number ("#") of B frames and the number of P and I frames in the segment (i.e., 1+#B/(#P+#I)); Res[i], the channel resolution, is the average number of macroblocks per second (i.e., an average macroblock rate); and U[i] is a user-controlled parameter that sets a priority of the channel, if desired. For a higher priority, average priority, or lower priority channel, set $U[i]>1$, $U[i]=1$, or $U[i]<1$. respectively.

If both the input and output of the channel are constant bit rate (CBR), one more factor, $G_{CBR}( )$, which is determined by the difference between input and output bit rate, may be applied. The analyzer 140 can determine the input bit rate, e.g., using a bit counter, and the output bit rate is set by the user.

Experimental or analysis data can be used to determine the functions F( ) and $G_{CBR}$ ( ). For example: F(M)=(alpha*(M−1)+1)/M, where alpha (e.g., 0.75) is ratio of the nominal complexity of a B frame to the nominal complexity of a P frame. Also, as an example: $G_{CBR}$ (R)=beta*R, where beta= 0.25 per Mbps.

At box 230, once the complexity estimates are calculated, an iterative "greedy" algorithm can be used to assign the channels to the TPEs as follows. During the assignment process, keep track of an accumulated complexity value for each TPE, which is a sum of the complexity measure of each channel that is assigned to a TPE. The accumulated complexity is an indication of the processing cycles that will be consumed by each TPE when the channels are assigned to it. Optionally, keep track of an accumulated resolution, which is a sum of the resolution of each channel that is assigned to a TPE.

For assigning the channels to the TPEs, arrange an array of complexity values, Comp[ ], in descending order. For the assignment of an initial channel, assign the unassigned channel of highest complexity to a first TPE, such as TPE 160. The first-assigned TPE can be chosen randomly, or in a arbitrarily predefined manner, since all TPEs have an equal accumulated complexity of zero at this time.

Generally, if there is a tie in the channels' complexity values, select the channel with the highest resolution. If there is a tie again, select the lower channel number or, otherwise, select randomly from among the tied channels.

For the assignment of channels after the initial channel, select the TPE that has the lowest value of accumulated complexity. If there is a tie, choose the TPE with lower accumulated resolution. If there is a tie again, choose the TPE with the smaller number of channels already assigned to it. If there is a tie again, choose the TPE with a lower TPE number, or otherwise randomly from among the tied TPEs.

At box 240, a check is made to determine if the assignment of the channel will result in an overload of the TPE. This may occur when a sum of the accumulated resolution and the resolution of the selected channel exceeds some predefined upper bound that is specific to the processing power of the TPE.

At box 250, if it is determined that the assignment of the channel with the highest complexity among the unassigned channels would result in an overload condition, the channel is assigned to the transcoder with the next lowest accumulated complexity.

If no such overload condition is presented, increment the accumulated complexity of the TPE that just had a channel assigned to it by the complexity of the assigned channel (box 260). Also, increment the accumulated resolution of the TPE by the resolution of the assigned channel.

At box 270, if all channels have been assigned to a transcoder, the process is complete, and wait until the next reconfiguration (box 280), when the process is repeated starting at box 200. If additional channels are still to be assigned, processing continues again at box 230 by assigning the remaining unassigned channel with the highest complexity to a TPE with the lowest accumulated complexity without overloading a TPE.

II. Selection of Cycle-Saving Modes on the Transcoder Core Processing Elements.

Overview

In accordance with the invention, each TPE 160, 170, ..., 180 selects an efficient mode for transcoding the frames of data from the channels assigned thereto. The following set of tools (transcoding modes) has been identified as providing viable transcoding strategies. Each tool is associated with a complexity requirement and an amount of artifacts. A different transcoding mode may be selected for every frame.

The transcoding modes include: (1) a full transcoding mode, (2) a requantization mode, and (3) a passthrough/bypass mode.

(1). Full transcoding is most computationally intensive but results in the least amount of artifacts. Full transcoding can comprise full decoding and re-encoding, with adjustment of the quantization level, $Q_2$, during re-encoding.

Figure 3A:
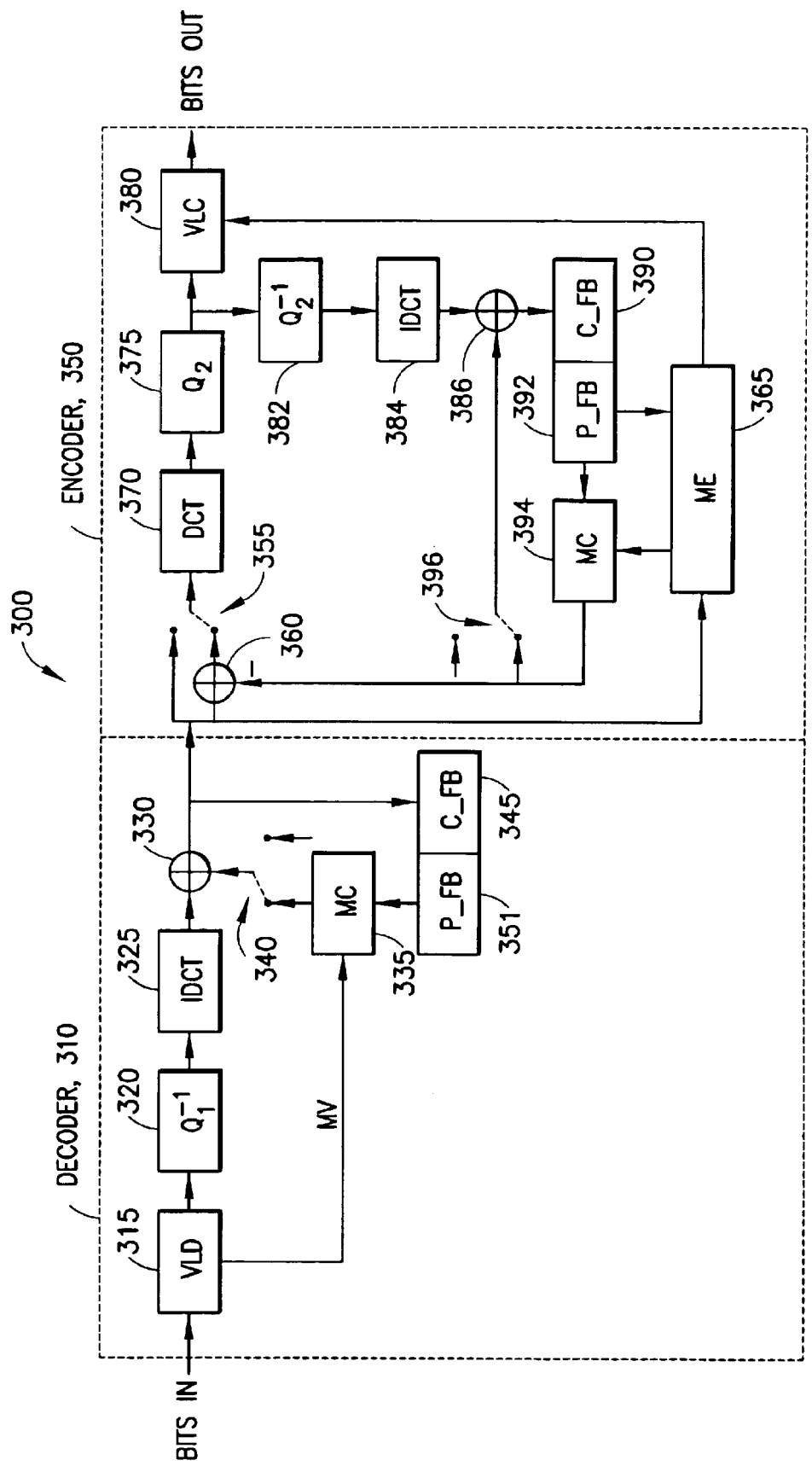
FIG. 3(a) illustrates a prior art transcoder that performs full transcoding, which is one of the transcoding modes that may be selected in accordance with the invention.
Figure 3B:
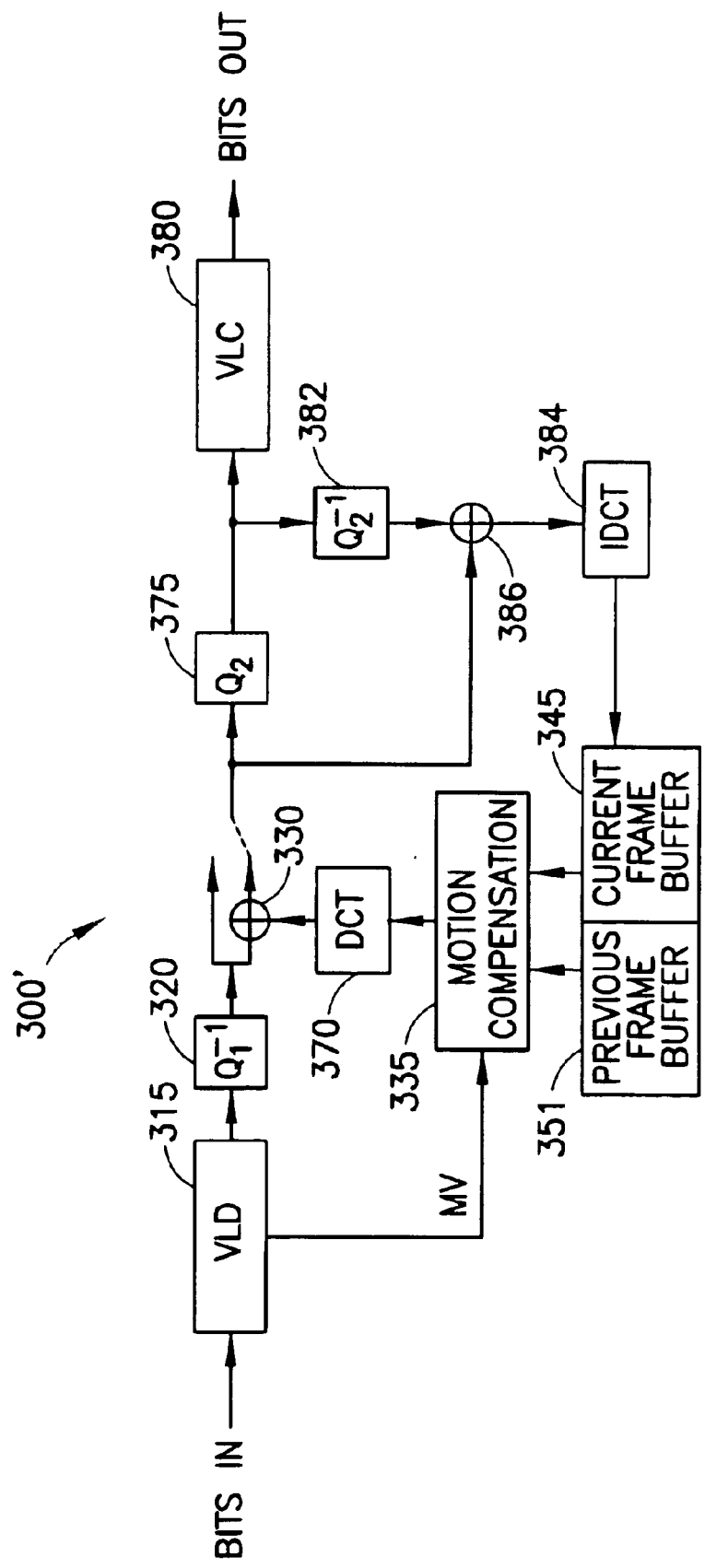
FIG. 3(b) illustrates a simplified transcoder that performs full transcoding, which is one of the transcoding modes that may be selected in accordance with the invention.

A simplified full transcoder, discussed in FIG. 3(b), may also be used.

Generally, the term "full transcoding" as used herein refers to transcoding where motion compensation is performed. Other processing, such as inverse quantization, IDCT, DCT and re-quantization are also typically performed.

FIG. 3(a) illustrates a prior art transcoder that performs full or regular transcoding, which is one of the transcoding modes that may be selected in accordance with the invention.

A straightforward transcoder can simply be a cascaded MPEG decoder and encoder. The cascaded transcoder first decodes a compressed channel to obtain a reconstructed video sequence. The reconstructed video sequence is then re-encoded to obtain a different compressed bitstream that is suitable for transmission, e.g., to a decoder population.

In particular, the transcoder 300 includes a decoder 310 and an encoder 350. A pre-compressed video bitstream is input to a Variable Length Decoder (VLD) 315. A dequantizer function 320 processes the output of the VLD 315 using a first quantization step size, $Q_1$. An Inverse Discrete Cosine Transform (IDCT) function 325 processes the output of the inverse quantizer 320 to provide pixel domain data to an adder 330. This data is summed with either a motion compensation difference signal from a Motion Compensator (MC) 335 or a null signal, according to the position of a switch 340.

The coding mode for each input macroblock (MB), either intra or inter mode, embedded in the input pre-compressed bit stream, is provided to the switch 340. The output of the adder 330 is provided to the encoder 350 and to a Current Frame Buffer (C_FB) 345 of the decoder 310. The MC function 335 uses data from the current FB 345 and from a Previous Frame Buffer (P_FB) 351 along with motion vector (MV) data from the VLD 315.

In the encoder 350, pixel data is provided to an intra/inter mode switch 355, an adder 360, and a Motion Estimation (ME) function 365. The switch 355 selects either the current pixel data, or the difference between the current pixel data and pixel data from a previous frame, for processing by a Discrete Cosine Transform (DCT) function 370, quantizer 375, and Variable Length Coding (VLC) function 380. The output of the VLC function 380 is a bitstream that is transmitted to a decoder. The bitstream includes Motion Vector (MV) data from the ME function 365.

The bit output rate of the transcoder is adjusted by changing $Q_2$.

In a feedback path, processing at an inverse quantizer 382 and an inverse DCT function 384 is performed to recover the pixel domain data. This data is summed with motion compensated data or a null signal at an adder 386, and the sum thereof is provided to a Current Frame Buffer (C_FB) 390. Data from the C_FB 390 and a P_FB 392 are provided to the ME function 365 and a MC function 394. A switch 396 directs either a null signal or the output of the MC function 394 to the adder 386 in response to an intra/inter mode switch control signal.

FIG. 3(b) illustrates a simplified transcoder that performs full (regular) transcoding, which is one of the transcoding modes that may be selected in accordance with the invention. Like-numbered elements correspond to those of FIG. 3(a).

The transcoder architecture 300' performs most operations in the DCT domain, so both the number of inverse-DCT and motion compensation operations are reduced. Moreover, since the motion vectors are not recalculated, the required computations are dramatically reduced. This simplified architecture offers a good combination of both low computation complexity and high flexibility.

Figure 4:
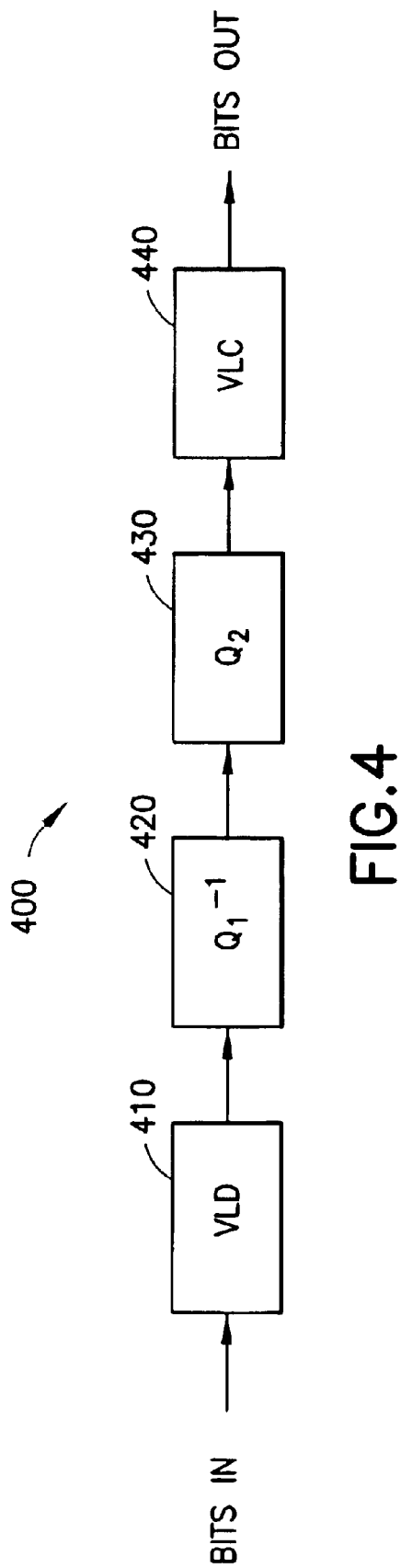
FIG. 4 illustrates a transcoder that performs re-quantization of frames in the DCT domain, without motion compensation, which is one of the transcoding modes that may be selected in accordance with the invention.

(2). The second transcoding mode is to apply only re-quantization to a frame, without motion compensation, as shown in FIG. 4. Generally, IDCT and DCT operations are avoided. This strategy incurs lower complexity than the first approach. If the picture is a B-frame, there is a medium amount of artifacts. If the picture is an I- or P-frame, there is a larger amount of artifacts due to drifting. Here, the DCT coefficients are de-quantized, then re-quantized.

FIG. 4 illustrates a transcoder 400 that performs re-quantization of frames in the DCT domain, without motion compensation, which is one of the transcoding modes that may be selected in accordance with the invention.

A VLD 410 function and an inverse quantization function 420 are used. Re-quantization occurs at a different quantization level at a function 430, and VLC is subsequently performed at a function 440.

(3). A third transcoding mode, or processing mode, is to passthrough (bypass) the bit stream without decoding or re-encoding. This strategy involves delaying the bitstream by a fixed amount of time, and has a complexity cost of almost zero, but is applicable only for small differences between the input and output bit rate. A statmux algorithm can be used to determine the output bit rate, hence determine if this mode should be used.

Effects of Delaying Encode Time

Figure 5:
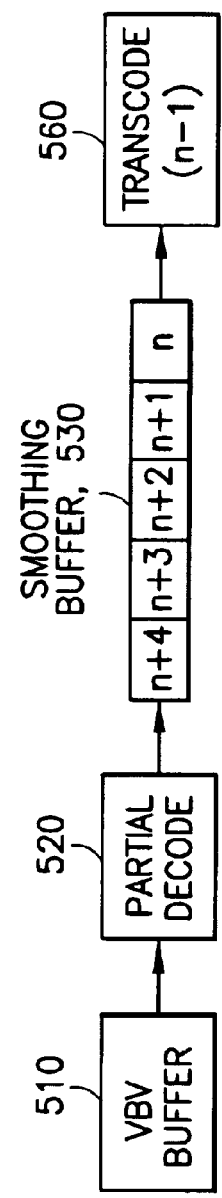
FIG. 5 illustrates a smoothing buffer for absorbing the variable processing time for different transcoding modes in accordance with the invention.

FIG. 5 illustrates a smoothing buffer for absorbing the variable processing times at the processors for the different transcoding modes in accordance with the invention. A video buffer verifier (vbv) buffer 510, partial decode function 520, smoothing buffer 530 (with a capacity of, e.g., five frames), and a transcode function 560 are provided. The function 520 includes a VLD, and also parses the bitstream header information, e.g., picture header to determine whether a picture is I, P or B frame. A vbv buffer simulates the buffer at a decoder. Note that the smoothing buffer 530 is after the vbv buffer 510, not before it. The smoothing buffer 530 and vbv buffer 510 are separate buffers, although they may share the same memory in an implementation.

Full transcoding may take more than a frame time to execute, while the requantizing and passthrough transcoding modes may take less than a frame time to execute, in which case, the smoothing buffers 162, 172, ..., 182 that each store up to, e.g., five input frames can be used to absorb the delay. This buffer should be on the TPEs. Moreover, there should be one such buffer for each video channel. At each TPE, a single buffer element can be apportioned among the different channels, or separate buffer elements can be used.

Processing Mode Selection

In this section, assume that a selection has been made to process one video frame from one of, e.g., three channels assigned to a TPE. Generally, when more than one channel is assigned to a TPE, one frame is processed from each channel in turn in a rotating fashion. The selection of the transcoding mode for that frame of video is now discussed.

Before a frame in a channel is selected for processing at a TPE, examine the processing cycles budgeted for the channel, and determine how far the video channel is deviating from its assigned budget. The deviation is measured in terms of a running sum for each channel defined as: deficit= old deficit+actual_cycles_used−frame_budget, where frame budget is defined as the cycle-budget per frame for that channel, and is computed as:

frame_budget=(total cycles per second available on the TPE*complexity of the channel/sum of complexity of all channels processed by the TPE)/frame rate of the channel, where the complexity measure of the channels are calculated during the channel allocation algorithm.

If the deficit on any channel exceeds a predetermined multiple of the frame_budget, a "panic mode" is invoked. For example, when the TPE buffer has a capacity of five frames, the panic mode may be invoked when the deficit exceeds four frames. Generally, the panic mode may be invoked when the deficit approaches the TPE buffer capacity (of the smoothing buffer 530). It is also possible to measure the actual fullness of the smoothing buffer to determine if the panic mode should be invoked. The panic mode indicates that the buffered frames need to be transcoded and output as soon as possible to avoid a buffer overflow.

The panic mode causes the frame that is processed next to be processed choosing the requantize mode, and only the lower order coefficients are requantized. That is, the higher frequency DCT coefficients are dropped. The range of lower frequency coefficients that are processed may vary depending on the current deficit.

In particular, the number of lower coefficients that are coded is adjusted based on the magnitude of the current deficit with respect to frame_budget. For example, if the deficit exceeds 4.6*frame_budget, then only the lower six coefficients are coded. Since the smoothing buffer stores only five input frames in the present example, it is necessary to "apply the brakes" when the deficit approaches five frames. While the value 4.6 has been used successfully, other values may be used, and the value used should be adjusted based on the number of frames that can be stored in the input buffer. The value may also be expressed in terms of a fractional buffer fullness, e.g., 4.6/5=0.92 or 92%.

Here, the coefficients are arranged in either of two zig-zag scanning orders, one for interlaced and the other for progressive picture. The number six is selected so that in either scan order, the lowest frequency 2×2 block of coefficients is preserved. This can be understood further by referring to the two ways in which DCT coefficients can be scanned, as explained in section 7.3 "Inverse scan" of the MPEG-2 specification, ISO/IEC 13818-2.

One may select different limits for P-frames vs. B-frames in choosing the range of coefficients that are coded (or, conversely, dropped) as a function of the current TPE deficit. For the present example, the same limit is used. The following table is an example implementation that shows the relationship between the deficit and the range of coefficients that are quantized. This refers to the number coefficients coded in each 8×8 DCT block of a MB (each MB has four luma and two chroma 8×8 blocks).

| If deficit > | Range of lower coefficients coded: |
|---|---|
| 4.0 * frame budget | 24 |
| 4.2 * frame budget | 12 |
| 4.6 * frame budget | 6 |
| 4.8 * frame budget | 1 |

All coefficients are coded if the deficit is ≦4.0*frame_budget.

Mode Decision

Figure 6:
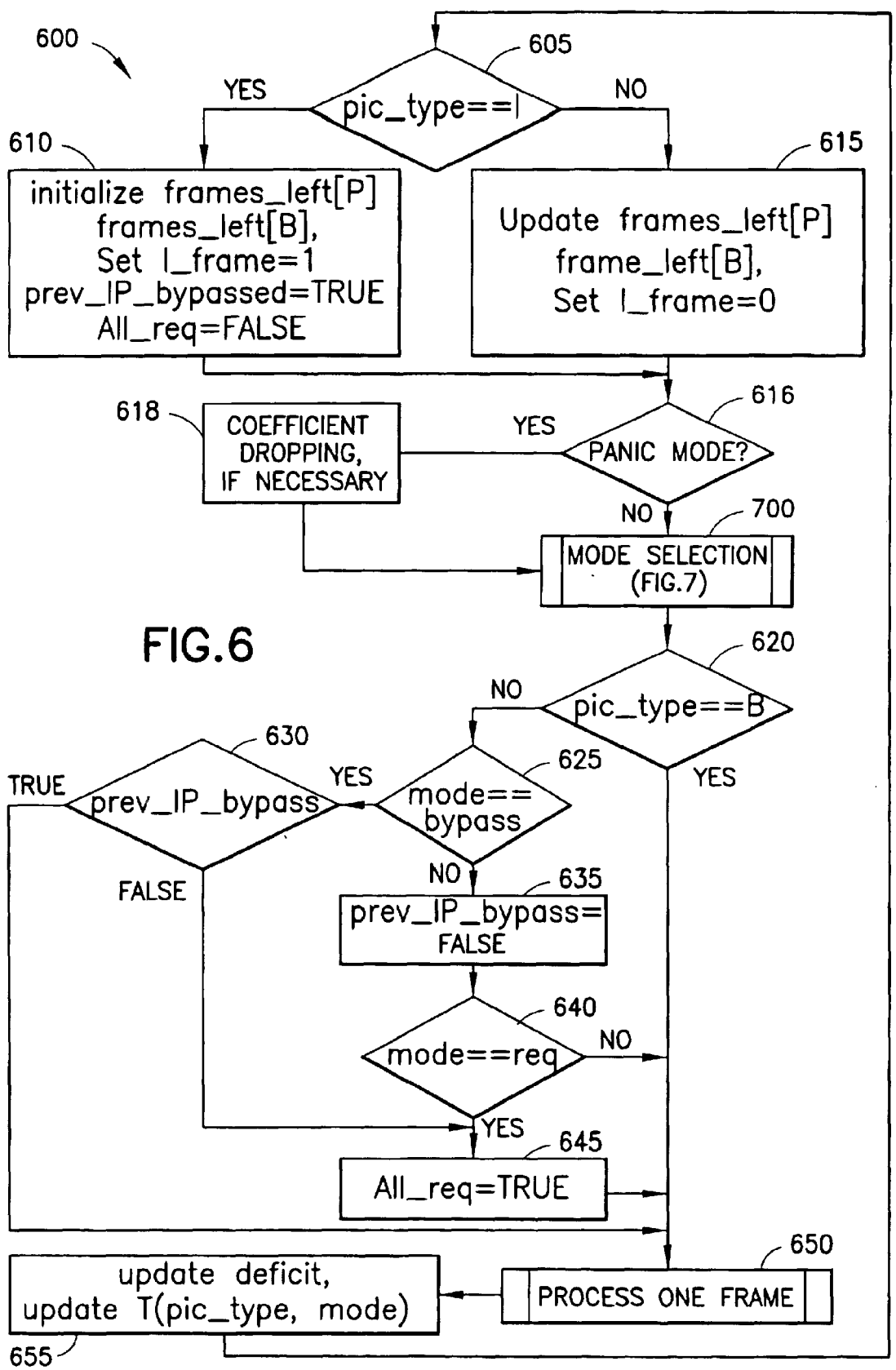
FIG. 6 illustrates the processing of a frame at a transcoder processing element (TPE) in accordance with the invention.

FIG. 6 illustrates the processing of a frame at a TPE in accordance with the invention.

In the process 600, if the current picture to be processed is an I-picture (block 605), the terms frames_left[P] and frames_left[B] are initialized, and the term I_frame is set to one, indicating the current frame is an I_frame. Also, the term prev_IP_bypassed is set to true, and the term all_req is set to false. If all_req is true, every subsequent frame in the same GOP is processed in requantize or bypass mode.

prev_IP_bypassed set to true indicates that the bypass mode was used in the previous P (or I) frame of the GOP. It indicates that the "reconstruction buffer" (buffer 351) on the transcoder is empty. If prev_IP_bypass is FALSE, (i.e., the reconstruction buffer of the transcoder is not empty), avoid bypassing the current frame.

Frames_left(P) and frames_left(B) are the estimated number of P and B frames left until the next GOP. At the beginning of a GOP, frames_left(P) and frames_left(B) are initialized as:

frames_left(P)=average number of P frames per GOP over the last ten GOPs; and frames_left(B)=average number of B frames per GOP over the last ten GOPs.

Any sufficiently large averaging window other than ten GOPs may be used. At startup, when previous data is not available for averaging, assume a nominal value based on the most commonly used configuration (e.g., GOP length= 15, two B frames for every pair of P frames, i.e. frames_left(P)=4, frames_left(B)=10).

All_req (all requantize) is a binary flag that is reset at the beginning of a GOP, and it is set once a P or I frame has been requantized in the requantization mode.

If the current picture is not an I picture, at block 615, the terms frames_left[P] and frames_left[B] are initialized, and the term I_frame is set to zero, indicating the current frame is not an I_frame.

At block 616, if a panic mode is set, processing proceeds at block 618. At block 618, coefficient dropping is performed as required, and as discussed previously. Specifically, if the mode is "requantize" or "transcode", and "deficit" exceeds the thresholds (defined in the table), coefficient dropping is used.

Figure 7:
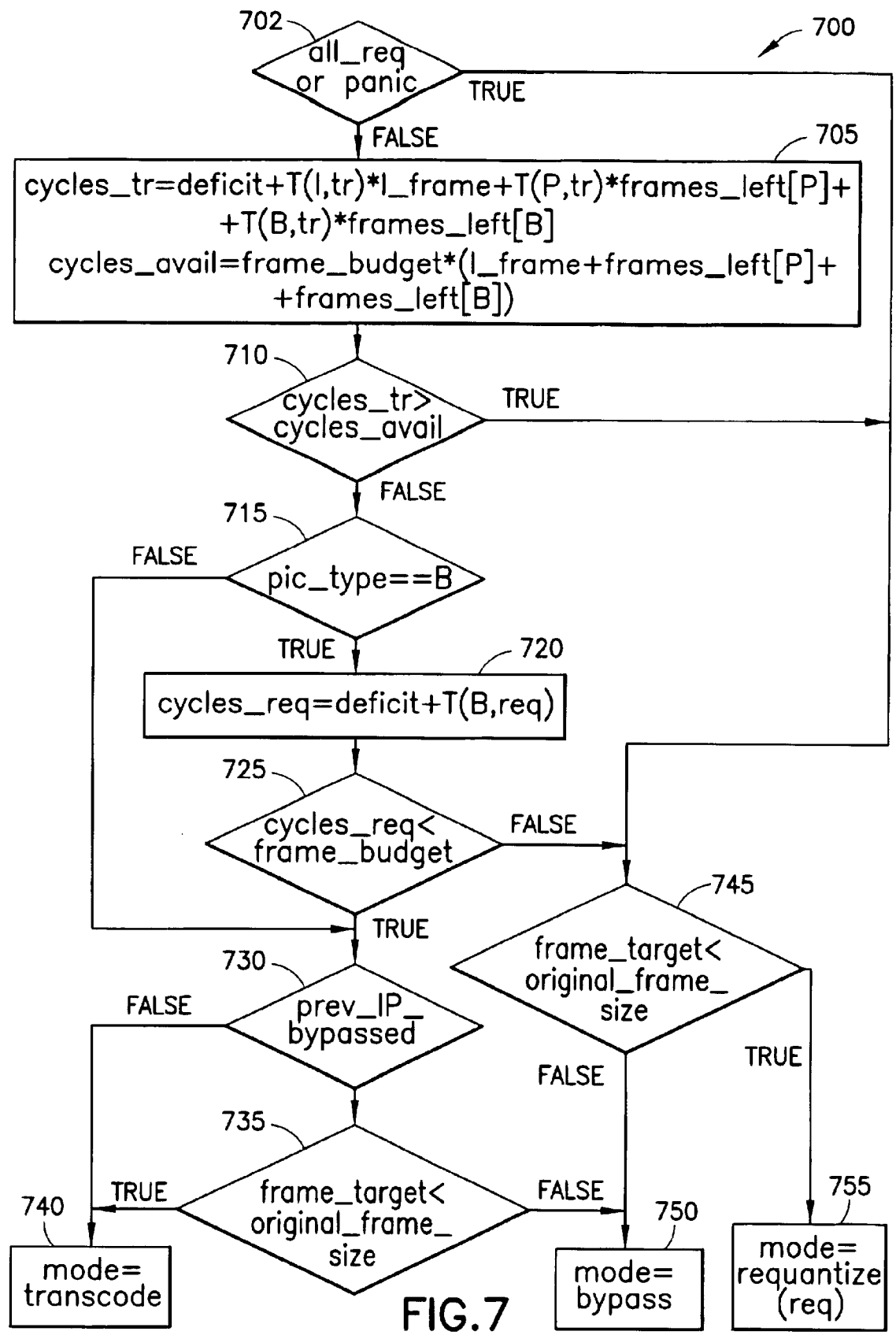
FIG. 7 illustrates the selection of a processing mode for a frame at a TPE in accordance with the invention.

At block 700, the processing mode selection is made using the process 700 of FIG. 7. Either a transcode, bypass or requantize mode is selected.

At block 620, if the current picture is a B-picture, it is processed using the designated mode at block 650. At block 655, the terms deficit and T(pic_type,mode) are updated.

At block 625, if the mode for the current picture is "bypass", and at block 630, if prev_IP_bypass is true, the frame is processed at block 650.

At block 630, if prev_IP_bypass is false, then all_req is set to true at block 645.

At block 635, prev_IP_bypass is set to false. At block 640, if the current frame is to be processed using the requantize mode, processing continues at block 645. Otherwise, processing continues at block 650.

FIG. 7 illustrates the selection of a processing mode for a frame at a TPE in accordance with the invention.

At block 702, if the all_req or panic mode has been invoked, processing continues at block 745. Panic mode is invoked when the "deficit" exceed a threshold (e.g., 4.0*frame_budget, as defined in the table). In panic mode, the frame is either bypassed, or processed in requant mode with coefficient dropping.

If frame_target<original_frame_size, the requantize mode is selected (block 755). original_frame_size is the number of bits in the input frame. Otherwise, the bypass mode is selected (block 750). frame_target (or target output frame size) is the number of bits to be generated at the output of the transcoder for this frame. Since transcoding reduces the number of bits in a frame, transcoding or requantization should not be performed if the target is bigger than the input number of bits in the frame. frame_budget is the number of cycles budgeted to process the frame.

If all_req and panic are false (block 702), processing continues at block 705, where cycles_tr and cycles_avail are set as indicated. cycles_tr is the estimate of the number of cycles required to process the remaining frames of the GOP if every frame is are processed with mode=transcode. cycle_avail is the number of cycles available (budgeted) for processing the remaining frames of this channel.

Let frame_budget be the number of processing cycles budgeted per frame for one video channel in a multiple channel TPE. frame_budget for channel i on a TPE is calculated as:

frame_budget[i]=((throughput of the TPE in cycles per second)*comp[i]/(sum of complexity of all channels on the TPE))*(1/frame rate of the channel).

T(P,tr) is the estimated number of cycles needed to transcode a P frame. T(I,tr) and T(B, tr) are defined similarly for I and B frames, respectively. fashion. The variables T(P, req), T(I,req) and T(B,req) are the estimates for requantization. The values of T( ) are estimated from previously transcoded, or requantized, frames. At startup, these are initialized to some nominal value.

At block 710, if cycles_tr>cycles_avail, processing continues at block 745. Otherwise, processing continues at block 715, where if the current picture is a B frame, processing continues at block 720, where the processing cycles required is updated. Them at block 725, if cycles_req<frame_budget is false, processing continues at block 745 as discussed. If cycles_req<frame_budget is true (block 725), and prev_IP_bypassed is false (block 730), a transcode mode is set for the current picture (block 740).

The "transcode" mode is also set for the current picture (block 740) if prev_IP_bypassed is true (block 730), and frame_target<original_frame_size is true (block 735).

The "bypass" mode is set for the current picture (block 750) if prev_IP_bypassed is true (block 730), and frame_target<original_frame_size is false (block 735).

Accordingly, it can be seen that the present invention provides an efficient video processor system. wherein a processing mode is set for each input video frame/picture, e.g., as a full transcode mode, which uses motion compensation, a requantize mode which does not use motion compensation, or a bypass mode. The processing mode selection accounts for a number of processing cycles that are available to process a frame, and an expected processing requirement of the frame.

Furthermore, to avoid an overflow of an input buffer at each transcoder, a panic condition is invoked when a processing cycle deficit become too high, as measured by the frame storage capacity of the input buffer. In this case, the bypass or requantization mode is selected to speed the frames through the transcoder.

Although the invention has been described in connection with various preferred embodiments, it should be appreciated that various modifications and adaptations may be made thereto without departing from the scope of the invention as set forth in the claims.

For example, one can use the mode selection algorithm to select a "mode" to encode a frame. The definition of "modes" could be the motion search range, for example, such that different "modes" have different processing cycle requirements.

What is claimed is:

1. A method for processing video comprising video frames, comprising:

maintaining a budget of a number of processing cycles that are available at a processor to process video data;

maintaining an estimate of the number of processing cycles required by the processor to process the video data;

providing the video data to the processor;

processing a plurality of channels of video data at the processor;

maintaining a number of budgeted processing cycles and an estimated number of required processing cycles separately for each channel;

determining for each respective channel if there is a processing cycle deficit associated with a current video frame of the respective channel based on a carried-over processing cycle deficit from a previous video frame, if any, of the respective channel and a difference between (a) an actual number of processing cycles used for the previous video frame of the respective channel, and (b) the number of budgeted processing cycles for the current video frame of the respective channel;

wherein the processor operates in a plurality of modes;

selecting one of the modes for processing each video frame according to a relationship between the number of budgeted processing cycles and the estimated number of required processing cycles; and when selecting a requantization mode higher-frequency discrete cosine transform (DCT) coefficients of the current video frame of a respective channel are dropped when it is determined that an overall processing cycle deficit exceeds predetermined level.

2. A method for processing video comprising video frames, comprising:

maintaining a budget of a number of processing cycles that are available at a processor to process video data;

maintaining an estimate of the number of processing cycles required by the processor to process the video data;

providing the video data to the processor;

wherein the processor operates in a plurality of modes, said plurality of modes comprising a full transcoding mode, a requantization mode and a bypass mode;

determining if there is a processing cycle deficit associated with a current video frame based on a carried-over processing cycle deficit, if any, from a previous frame and a difference between (a) an actual number of processing cycles used for the previous video frame, and (b) a number of budgeted processing cycles for the current video frame; and selecting one of the modes for processing each video frame according to a relationship between the number of budgeted processing cycles and the estimated number of required processing cycles;

wherein one of the requantization mode and the bypass mode is selected for a current video frame responsive to a determination that there is a processing cycle deficit associated therewith.

3. The method of claim 2, wherein:
the estimated number of required processing cycles is updated after each video frame is processed.

4. The method of claim 2, wherein:
the number of budgeted processing cycles is updated after each video frame is processed.

5. The method of claim 2, wherein:
when a requantization mode is selected for one of an I and P video frame in a group of pictures (GOP) of the video data, the requantization mode is also selected for all subsequent P frames in the GOP.

6. The method of claim 2, wherein:
the number of budgeted processing cycles and the estimated number of required processing cycles are provided for remaining frames of a group of pictures (GOP) of the video data.

7. The method of claim 2, wherein:
the estimated number of required processing cycles associated with a current video frame is responsive to an actual number of processing cycles consumed for at least one previous video frame.

8. The method of claim 2, comprising the further step of:
storing the video frames in a buffer associated with the respective processor prior to processing the video frames; wherein:
the buffer comprises a smoothing buffer for accommodating variable processing times at the processor for the video frames in the different processing modes.

9. The method of claim 2, wherein:
the processor is a multi-processor device.

10. The method of claim 2, wherein:
the different modes have different computational intensities.

11. The method of claim 2, wherein:
a plurality of channels of video data are processed at the processor, and the number of budgeted processing cycles and the estimated number of required processing cycles are maintained separately for each channel.

12. The method of claim 11, comprising the further step of:
for each respective channel, determining if there is a processing cycle deficit associated with a current video frame of the respective channel based on a carried-over processing cycle deficit, if any, from a previous frame of the respective channel, and a difference between: (a) an actual number of processing cycles used for the previous video frame of the respective channel, and (b) the number of budgeted processing cycles for the current video frame of the respective channel.

13. The method of claim 2, wherein:
in the full transcoding mode, motion compensation processing of the video data in a pixel domain is performed.

14. The method of claim 2, wherein:
in the requantization mode, the video data is requantized in a frequency transform domain without performing motion compensation processing.

15. The method of claim 2, wherein:
in the bypass mode, the video bypasses motion compensation processing and requantization.

16. The method of claim 2, wherein:
the processing cycle deficit is used in determining the estimated number of required processing cycles.

17. The method of claim 2, wherein:
the processing cycle deficit is associated with remaining frames of a group of pictures (GOP) of the video data.

18. The method of claim 2, wherein:
the selected mode for the current video frame is based on whether the processing cycle deficit associated therewith exceeds a predetermined level.

19. A method for processing video comprising video frames, comprising:
maintaining a budget of a number of processing cycles that are available at a processor to process video data;
maintaining an estimate of the number of processing cycles required by the processor to process the video data;
providing the video data to the processor;
wherein the processor operates in a plurality of modes, said plurality of modes comprising a full transcoding mode, a requantization mode and a bypass mode;
determining if there is a processing cycle deficit associated with a current video frame based on a carried-over processing cycle deficit, if any, from a previous frame; and a difference between (a) an actual number of processing cycles used for a previous video frame, and (b) a number of budgeted processing cycles for the current video frame; and
selecting one of the modes for processing each video frame according to a relationship between the number of budgeted processing cycles and the estimated number of required processing cycles;
wherein one of the requantization mode and the bypass mode is selected for the current video frame responsive to a determination that the processing cycle deficit associated therewith exceeds a predetermined level.

20. A method for processing video comprising video frames, comprising:
maintaining a budget of a number of processing cycles that are available at a processor to process video data;
maintaining an estimate of the number of processing cycles required by the processor to process the video data;
providing the video data to the processor;
wherein the processor operates in a plurality of modes, said plurality of modes comprising a full transcoding mode, a requantization mode and a bypass mode;
determining if there is processing cycle deficit associated with a current video frame based on a carried-over processing cycle deficit, if any, from a previous video frame and a difference between (a) an actual number of processing cycles used for the previous video frame, and (b) a number of budgeted processing cycles for the current video frame; and
selecting one of the modes for processing each video frame according to a relationship between the number of budgeted processing cycles and the estimated number of required processing cycles;
wherein when the requantization mode is selected, and when it is determined that the processing cycle deficit associated therewith exceeds a predetermined level, higher-frequency discrete cosine transform (DCT) coefficients are dropped in the current video frame.

21. The method of claim 20, wherein:

the predetermined level is a function of an expected fullness level of a buffer associated with the processor in which the video frames are stored prior to processing.

22. The method of claim 20, wherein:

different levels of coefficient dropping are used according to a picture type of the current video frame.

* * * * *